United States Patent
Ikeda et al.

(10) Patent No.: US 9,031,730 B2
(45) Date of Patent: May 12, 2015

(54) POWER DEMAND MANAGEMENT APPARATUS AND POWER DEMAND MANAGEMENT SYSTEM

(71) Applicants: ENERES Co., Ltd., Tokyo (JP); The Japan Research Institute, Limited, Tokyo (JP)

(72) Inventors: Motohide Ikeda, Tokyo (JP); Ken Watanabe, Tokyo (JP); Makoto Inoue, Kanagawa (JP)

(73) Assignee: The Japan Research Institute, Limited, Tokyo (JP)

( * ) Notice: Subject to any disclaimer, the term of this patent is extended or adjusted under 35 U.S.C. 154(b) by 194 days.

(21) Appl. No.: 13/689,778

(22) Filed: Nov. 30, 2012

(65) Prior Publication Data
US 2013/0166133 A1 Jun. 27, 2013

Related U.S. Application Data

(63) Continuation of application No. PCT/JP2011/003010, filed on May 30, 2011.

(30) Foreign Application Priority Data

May 31, 2010 (JP) ................................ 2010-124854

(51) Int. Cl.
*G01C 22/00* (2006.01)
*B25J 9/00* (2006.01)
(Continued)

(52) U.S. Cl.
CPC .............. *B25J 9/0003* (2013.01); *Y10S 901/01* (2013.01); *G05D 1/027* (2013.01); *G05D 1/0272* (2013.01); *H02J 3/14* (2013.01); *H02J 2003/143* (2013.01); *Y02B 70/3225* (2013.01);
(Continued)

(58) Field of Classification Search
CPC .............................. G05D 1/0272; G05D 1/027
See application file for complete search history.

(56) References Cited

U.S. PATENT DOCUMENTS 5,915,026 A * 6/1999 Mankovitz .................... 713/168
6,853,291 B1 * 2/2005 Aisa ............................. 340/3.3
(Continued)

FOREIGN PATENT DOCUMENTS

| JP | 2008-271721 A | 11/2008 |
| JP | 2009-225629 A | 10/2009 |
| JP | 2009-247043 A | 10/2009 |

OTHER PUBLICATIONS

Supplementary Search Report for European Application No. 11789433.7, issued by the European Patent Office on Feb. 5, 2014.
(Continued)

*Primary Examiner* — Calvin Cheung

(57) ABSTRACT

A power demand management apparatus comprises a schedule holding section that holds a power restriction schedule indicating a device on which a mobile robot is to perform power restriction, in association with a power restriction execution time; a movement instructing section that transmits movement instructions to the robot such that, prior to the power restriction execution time indicated in the power restriction schedule, the robot moves to an area in which is arranged the device on which the power restriction is to be performed at the execution time; and a restriction instructing section that transmits power restriction instructions to the robot, thereby causing the robot to perform the power restriction on the device at the execution time.

16 Claims, 11 Drawing Sheets

(51) Int. Cl.
*H02J 3/14* (2006.01)
*G05D 1/02* (2006.01)

(52) U.S. Cl.
CPC .......... *Y02B 70/3266* (2013.01); *Y04S 20/222* (2013.01); *Y04S 20/242* (2013.01)

(56) References Cited

U.S. PATENT DOCUMENTS

| | | | |
|---|---|---|---|
| 7,161,483 B2* | 1/2007 | Chung | 340/531 |
| 7,860,680 B2* | 12/2010 | Arms et al. | 702/127 |
| 8,155,289 B2* | 4/2012 | Kitagawa | 379/102.01 |
| 8,170,722 B1* | 5/2012 | Elberbaum | 700/295 |
| 8,736,228 B1* | 5/2014 | Freed et al. | 320/115 |
| 2002/0193908 A1* | 12/2002 | Parker et al. | 700/258 |
| 2003/0036822 A1* | 2/2003 | Davis et al. | 700/295 |
| 2006/0161270 A1* | 7/2006 | Luskin et al. | 700/22 |
| 2006/0190134 A1* | 8/2006 | Ziegler et al. | 700/245 |
| 2006/0192523 A1* | 8/2006 | Nomoto | 320/101 |
| 2006/0208099 A1* | 9/2006 | Chapman et al. | 236/51 |
| 2006/0290779 A1* | 12/2006 | Reverte et al. | 348/84 |
| 2007/0061041 A1* | 3/2007 | Zweig | 700/245 |
| 2007/0165555 A1* | 7/2007 | Deng et al. | 370/318 |
| 2007/0199108 A1* | 8/2007 | Angle et al. | 901/17 |
| 2007/0244610 A1* | 10/2007 | Ozick et al. | 701/23 |
| 2008/0141265 A1* | 6/2008 | Choi | 718/105 |
| 2009/0281661 A1* | 11/2009 | Dooley et al. | 700/258 |
| 2009/0292402 A1* | 11/2009 | Cruickshank, III | 700/287 |
| 2010/0070101 A1* | 3/2010 | Benes et al. | 700/296 |
| 2011/0087904 A1* | 4/2011 | Lee et al. | 713/320 |
| 2011/0153110 A1* | 6/2011 | Drake et al. | 700/296 |
| 2011/0184575 A1* | 7/2011 | Kawamoto et al. | 700/292 |
| 2011/0196547 A1* | 8/2011 | Park et al. | 700/296 |
| 2011/0270452 A1* | 11/2011 | Lu et al. | 700/291 |
| 2012/0095606 A1* | 4/2012 | Besore et al. | 700/291 |
| 2012/0101652 A1* | 4/2012 | Shin et al. | 700/296 |
| 2013/0253701 A1* | 9/2013 | Halloran et al. | 700/245 |
| 2014/0090201 A1* | 4/2014 | Gilbert, Jr. | 15/320 |
| 2014/0222234 A1* | 8/2014 | Hirayama | 700/295 |

OTHER PUBLICATIONS

Mehling, J.S., et al., "Centaur: NASA's Mobile Humanoid Designed for Field Work", 2007 IEEE International Conference on Robotics and Automation, Apr. 10, 2007, pp. 2928-2933, Rome, Italy, XP031389241, ISBN:978-1-4244-0601-2.

International Search Report for International application No. PCT/JP2011/003010.

Translation of International Preliminary Report on Patentability for International application No. PCT/JP2011/003010.

* cited by examiner

| EXECUTION TIME | DEVICE | PRIORITY RANKING |
|---|---|---|
| 11:00 | TELEVISION A | 1 |
| | LIGHTING APPARATUS A | 2 |
| | LIGHTING APPARATUS B | 3 |
| 14:00 | AIR CONDITIONER A | 1 |
| | TELEVISION A | 2 |
| | LIGHTING APPARATUS A | 3 |
| | LIGHTING APPARATUS B | 4 |

FIG.3

| DEVICE | POSITION |
|---|---|
| LIGHTING APPARATUS A | FIRST FLOOR LIVING ROOM |
| LIGHTING APPARATUS B | FIRST FLOOR ENTRYWAY |
| LIGHTING APPARATUS C | SECOND FLOOR BEDROOM |
| AIR CONDITIONER A | FIRST FLOOR LIVING ROOM |
| AIR CONDITIONER B | SECOND FLOOR BEDROOM |
| TELEVISION A | FIRST FLOOR LIVING ROOM |

FIG.4

| DEVICE | ON TIME | OFF TIME | OPERATIONAL STATE |
|---|---|---|---|
| LIGHTING APPARATUS A | 6:00 | 6:30 | OFF |
| LIGHTING APPARATUS B | 17:00 | 19:00 | OFF |
| LIGHTING APPARATUS C | 19:00 | - | ON |
| AIR CONDITIONER A | 14:00 | 17:00 | OFF |
| AIR CONDITIONER B | - | - | OFF |
| TELEVISION A | 20:00 | - | ON |

FIG.8

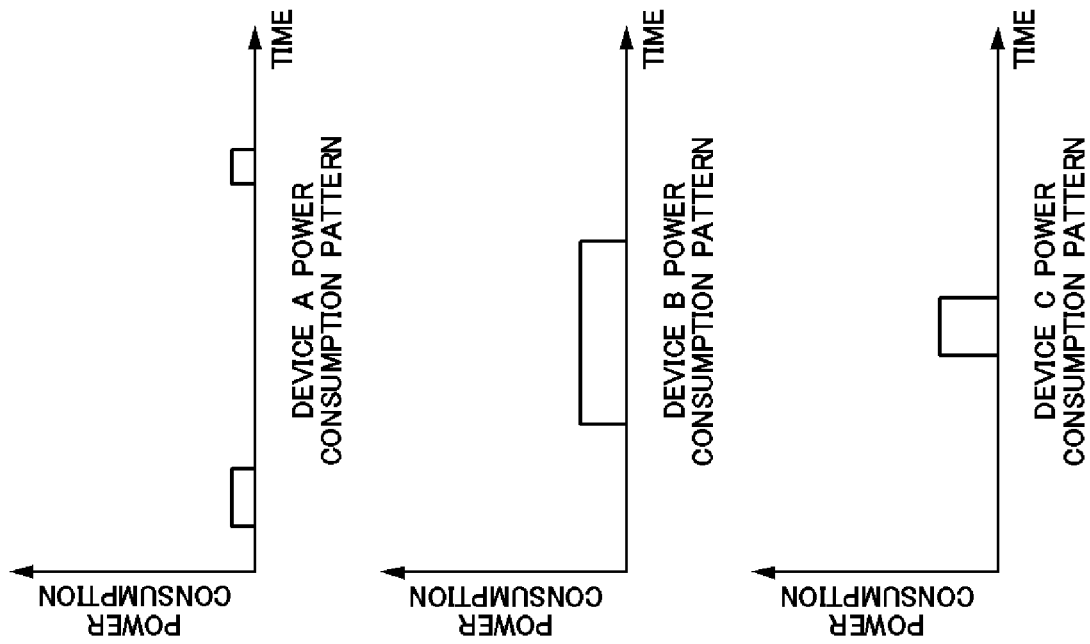
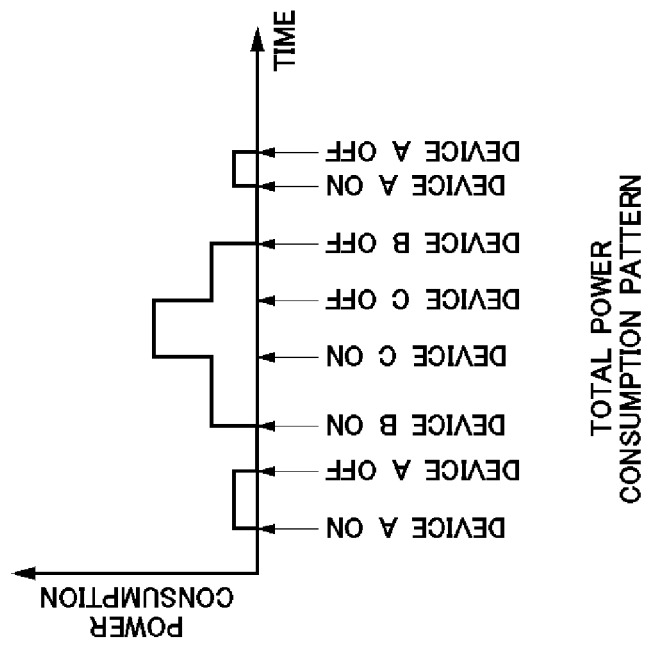
FIG. 9

| DEVICE | SETTING CONDITION | TEMPERATURE | POWER CONSUMPTION |
| --- | --- | --- | --- |
| LIGHTING APPARATUS A | BRIGHTNESS 100% | — | 60W |
| | BRIGHTNESS 50% | — | 35W |
| LIGHTING APPARATUS B | BRIGHTNESS 100% | — | 30W |
| LIGHTING APPARATUS C | BRIGHTNESS 100% | — | 40W |
| AIR CONDITIONER A | HEATING, SET TEMPERATURE 25 DEGREES | 10 DEGREES | 800W |
| | COOLING, SET TEMPERATURE 28 DEGREES | 30 DEGREES | 1200W |
| AIR CONDITIONER B | HEATING, SET TEMPERATURE 25 DEGREES | 10 DEGREES | 850W |
| | COOLING,SET TEMPERATURE 28 DEGREES | 30 DEGREES | 1350W |
| | COOLING,SET TEMPERATURE 28 DEGREES | 32 DEGREES | 1500W |
| TELEVISION A | — | — | 250W |

FIG.10

POWER DEMAND MANAGEMENT APPARATUS AND POWER DEMAND MANAGEMENT SYSTEM

The contents of the following Japanese patent application are incorporated herein by reference:

NO. 2010-124854 filed on May 31, 2010.

BACKGROUND

1. Technical Field

The present invention relates to a power demand management system and a power demand management apparatus for managing power demand of devices.

2. Related Art

A conventional system for controlling power demand by controlling the power consumption of devices has been proposed (for example, see Patent Documents 1 to 3).

Patent Document 1: Japanese Patent Application Publication No. 2008-271721
Patent Document 2: Japanese Patent Application Publication No. 2009-247043
Patent Document 3: Japanese Patent Application Publication No. 2009-225629

In the conventional system for controlling power demand it is necessary to provide the function for controlling the power consumption from the outside in the device to be controlled and to connect the apparatus for controlling the power consumption of a device between the device and the power supply, for example.

The present invention provides a system that can control the power consumption of a device without providing the function for controlling the power consumption from the outside in the device to be controlled and without connecting the apparatus for controlling the power consumption of a device between the device and the power supply.

SUMMARY

According to an aspect of the present invention, provided is a power demand management apparatus comprising a schedule holding section that holds a power restriction schedule indicating a device on which a mobile robot is to perform power restriction, in association with a power restriction execution time; a movement instructing section that transmits movement instructions to the robot such that, prior to the power restriction execution time indicated in the power restriction schedule, the robot moves to an area in which is arranged the device on which the power restriction is to be performed at the execution time; and a restriction instructing section that transmits power restriction instructions to the robot, thereby causing the robot to perform the power restriction on the device at the execution time.

The power demand management apparatus described above may further comprise an operational state information acquiring section that, after the movement instructions are sent, acquires from the robot operational state information indicating a current operational state of the device. The schedule holding section may hold the power restriction schedule, in which is shown the device and another device that has a lower priority ranking than the device, in association with the execution time, and the movement instructing section may determine whether the device is currently operating based on the operational state information and, if the device is not currently operating, may transmit movement instructions to the robot that cause the robot to move to an area in which the other device is arranged.

The power demand management apparatus described above may further comprise a power consumption pattern acquiring section that acquires power consumption patterns for a plurality of devices; and a schedule creating section that identifies devices whose power consumption is greater than or equal to a predetermined threshold value at the execution time, based on the power consumption patterns, creates the power restriction schedule, in which the priority ranking is arranged in order of the identified devices having the highest power consumption, in association with the execution time, and holds the power restriction schedule in the schedule holding section.

The power demand management apparatus described above may further comprise a designation information acquiring section that acquires, from a user of the devices, designation information indicating devices that are allowed to be selected as the devices on which power restriction is to be performed from among the plurality of devices. The schedule creating section may select the devices indicated by the designation information from among the identified devices, and may create the power restriction schedule, in which the priority ranking is arranged in order of the selected devices having the highest power consumption, in association with the execution time.

The power demand management apparatus described above may further comprise a position information holding section that holds position information in which each of a plurality of devices are associated with a position of an area in which the device is arranged. The movement instructing section may identify the position of the area corresponding to each device by referencing the position information, and may transmit to the robot movement instructions indicating the identified position.

According to an aspect of the present invention, provided is a power demand management system comprising: the power demand management apparatus described above; and the mobile robot described above.

In the power demand management system described above, in response to the movement instructions, the robot provides the power demand management apparatus with operational state information indicating a current operational state of a device arranged in an area that is the movement destination.

The summary clause does not necessarily describe all necessary features of the embodiments of the present invention. The present invention may also be a sub-combination of the features described above.

BRIEF DESCRIPTION OF THE DRAWINGS

FIG. 3 shows an exemplary power restriction schedule.

FIG. 4 shows exemplary position information held by the position information holding section.

FIG. 8 shows exemplary operational state information held by the operational state information holding section.

FIG. 9 is a diagram for describing the process for dividing the overall power consumption pattern into power consumption patterns for each device.

FIG. 10 shows exemplary power consumption information held by the power consumption holding section.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

Figure 1:
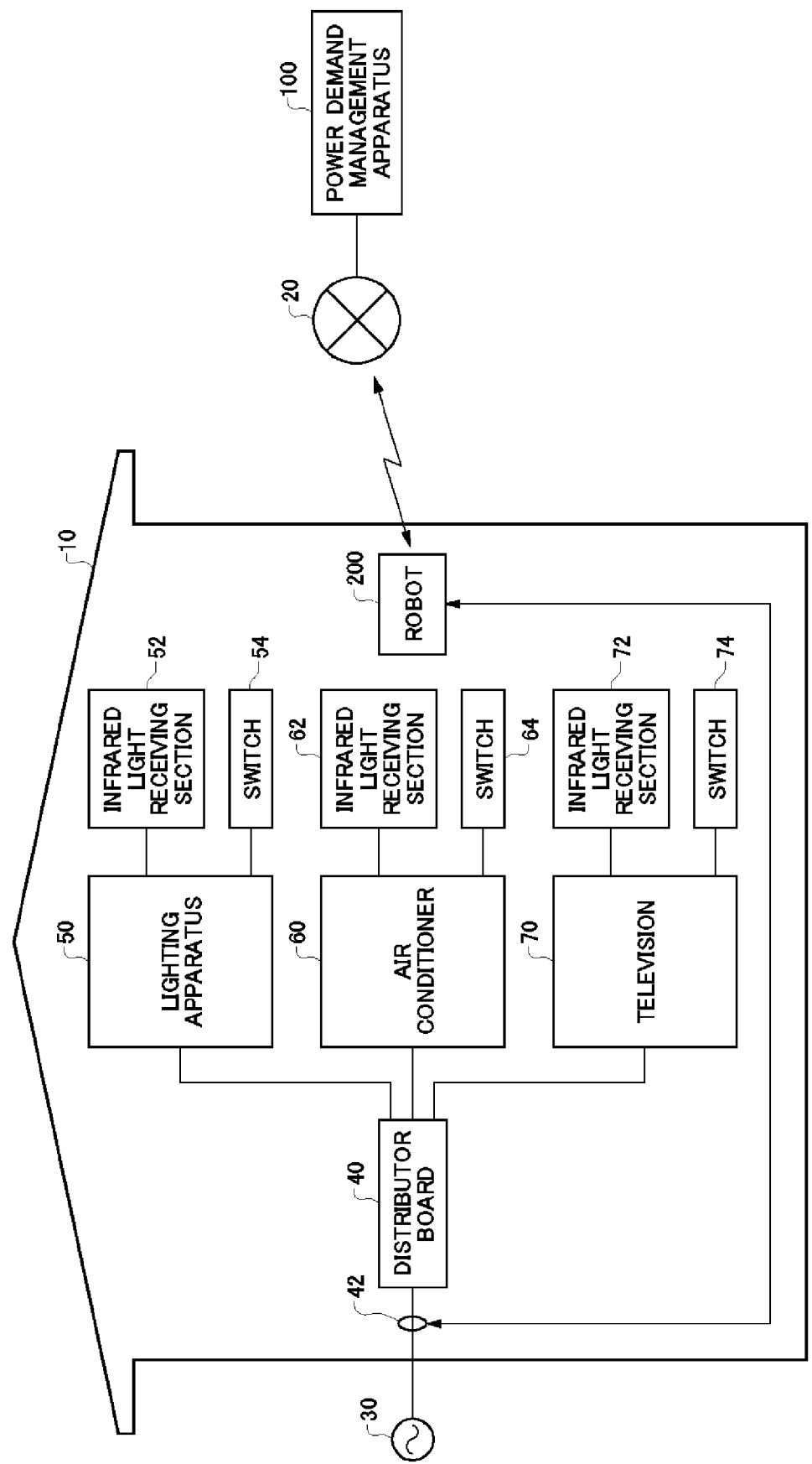
FIG. 1 shows an overall configuration of a power demand management system according to an embodiment of the present invention.

FIG. 1 shows an overall configuration of a power demand management system according to an embodiment of the present invention. A power demand management apparatus 100 transmits power restriction instructions to a robot 200 disposed in a house 10, via a network 20, at a predetermined execution time. The robot 200 can move freely within the house 10 and, in response to the power restriction instructions, performs power restriction for a plurality of devices arranged within the house 10. In the present embodiment, the targets of the power restriction are devices arranged within the house 10, but devices outside the house 10 may also be targets of the power restriction. Furthermore, the targets of the power restriction in the present embodiment are devices arranged within the house 10, but devices arranged on a plurality of floors in a building may also be the targets of the power restriction. Yet further, in the present embodiment, a single robot 200 is provided for the house 10, but a plurality of robots 200 may instead be provided for the house 10.

The plurality of devices may be electrical devices that consume power, such as a lighting apparatus 50, an air conditioner 60, and a television 70. The devices are connected to a commercial power supply 30 via a distribution board 40, and the power from the commercial power supply 30 is supplied to the devices. On the input side of the commercial power supply 30 of the distribution board 40, a power sensor 42 is provided that measures the total power value per unit time that is consumed by the house 10, and the power sensor 42 transmits power data indicating the total power value per unit time at predetermined intervals, such as every minute, to the robot 200 via a wireless network. The lighting apparatus 50, the air conditioner 60, and the television 70 respectively include infrared light receiving sections 52, 62, and 72 and switches 54, 64, and 74. In accordance with the power restriction instructions, the robot 200 may turn OFF the power supplies of the lighting apparatus 50, air conditioner 60, and television 70 via the infrared light receiving sections 52, 62, and 72 or the switches 54, 64, and 74, thereby restricting the power consumption. In accordance with the power restriction instructions, the robot 200 may restrict the power consumption by adjusting the brightness of the lighting apparatus 50 via the infrared light receiving section 52 or the switch 54. In accordance with the power restriction instructions, the robot 200 may restrict the power consumption by adjusting the set temperature of the air conditioner 60 via the infrared light receiving section 62 or the switch 64.

The power demand management apparatus 100 may be provided in a facility managed by a specified electric power supplier, for example. The specified electric power supplier can also be referred to as a "power producer and supplier" (PPS). The specified electric power supplier may predict the power demand for the following day and, based on the predicted power demand, purchase the power for the following day from a power wholesaler or the like in advance and supply this power to the contractor on the following day. When predicting the power demand for the following day, the specified electric power supplier may request that the contractor restrict power at a specified time, for example, and predict whether the contractor will comply with the request. In this case, when predicting the power demand of the following day, the specified electric power supplier may also consider the power demand that has been restricted by the performance of power restriction at a specified time. The execution time at which power demand management apparatus 100 transmits the power restriction instructions to the robot 200 may be a time at which power restriction has been determined to be performed by the contractor when predicting the power demand. As another example, the execution time may be a time during which power restriction has been allowed by the contractor in advance. As yet another example, the execution time may be a time at which the power restriction has been determined to be executed when the current power demand exceeds a predetermined threshold value based on the expected power demand.

As described above, in the power demand management system according to the present embodiment, in accordance with the power restriction instructions transmitted from the power demand management apparatus 100 at a predetermined execution time, the robot 200 directly operates the devices via infrared communication or switches to perform the power restriction. Accordingly, when performing the power restriction, the robot 200 must move near the devices that are targets of the power restriction. However, when the robot 200 receives the power restriction instructions and then starts the operation of moving near a device that is a target of the power restriction, there is a certain time required until the robot 200 actually performs power restriction on the device, and this means that there is a certain time until the power is restricted. Since it takes time to actually restrict the power, a difference occurs between the predicted power demand and the actual power demand, for example, which can result in a lack of power. In such a case, the specified electric power supplier might need to ensure power using another means.

Therefore, in the present embodiment, the time from when the power restriction instructions are sent to when the power is actually restricted is shortened by, prior to the execution time, causing the robot 200 to move in advance near a device that is to be power-restricted at the execution time and to wait near the device.

Furthermore, in the present embodiment, the power restriction is performed on a predetermined device at a predetermined execution time. The device that is the target of the power restriction performed at the execution time is a device that is predicted to have a high probability of consuming power at the execution time, based on a past power consumption pattern, as described further below. However, it is not guaranteed that this device is actually operating at the execution time. In other words, even if the robot 200 is moved near the device prior to the execution time, there is still a chance that the device is not operating and that the power cannot be restricted when the robot 200 performs power restriction on this device according to the power restriction instructions.

Therefore, in the present embodiment, in response to movement instructions, the robot 200 transmits to the power demand management apparatus 100 operational state information indicating an operational state of a movement destination device based on the movement instructions. The power demand management apparatus 100 determines whether this device is currently operating based on the operational state information and, if this device is not operating, selects another predetermined device at the execution time and transmits new movement instructions to the robot 200 such that the robot 200 moves near the other device. In this way, the chance that the robot 200 will move and wait near a device that is currently consuming power, prior to the execution time of the power restriction, is increased. Accordingly, by having the robot 200 perform the power restriction based on the power restriction instructions, the chance that the power will be restricted is increased.

Figure 2:
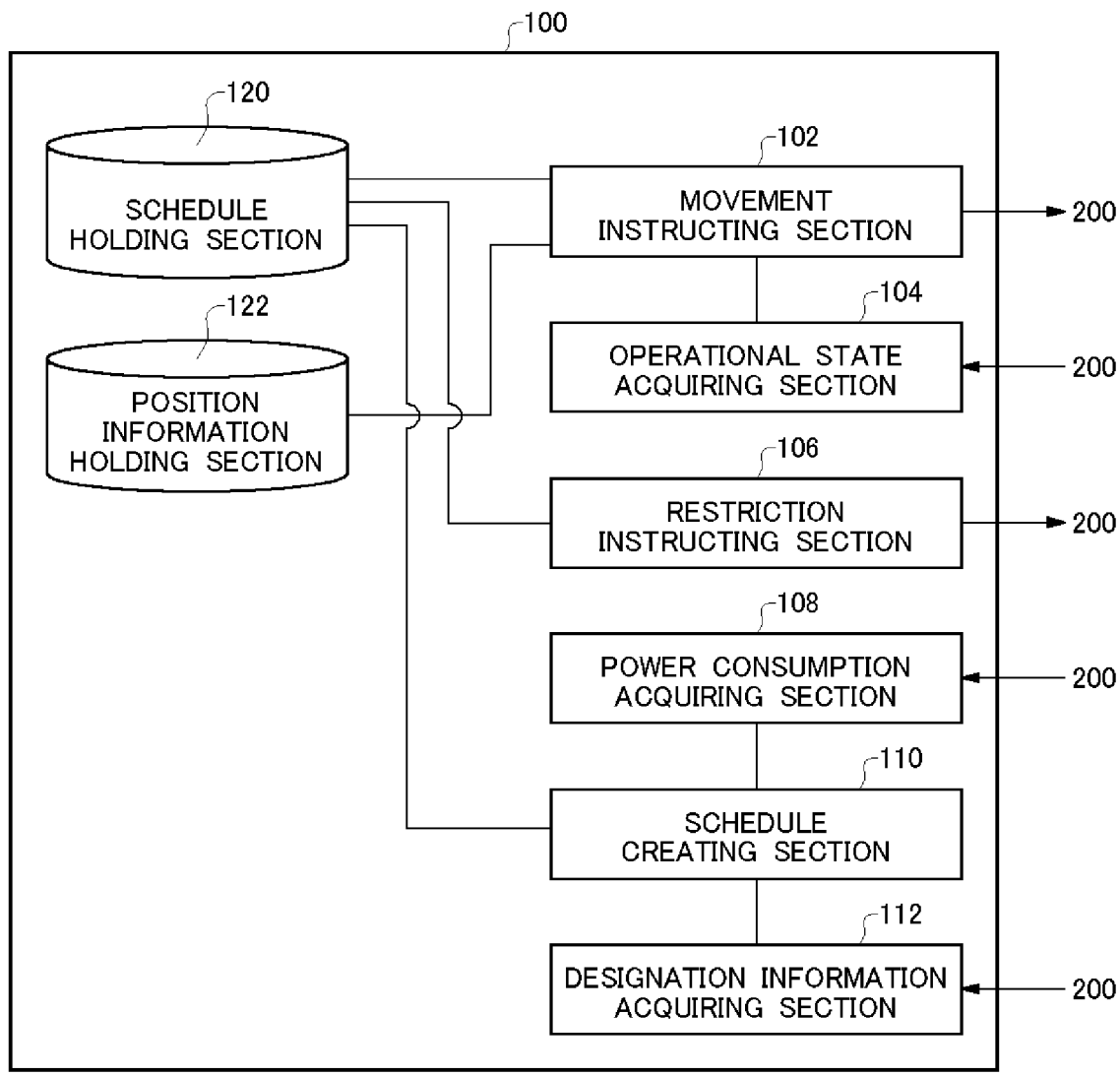
FIG. 2 shows function blocks of the power demand management apparatus.

FIG. 2 shows function blocks of the power demand management apparatus 100. The movement instructing section 102 identifies a device on which the power restriction is to be performed at the next execution time, based on a power restriction schedule held in the schedule holding section 120. Furthermore, the movement instructing section 102 references the position information holding section 122, identifies a position of an area where the identified device is arranged, and transmits to the robot 200 movement instructions indicating the identified position a prescribed amount of time before the next execution time.

The operational state acquiring section 104 acquires the operational state information indicating the current operational state of the device arranged in the movement destination area transmitted from the robot 200 in response to the movement instructions, and supplies this operational state information to the movement instructing section 102. The movement instructing section 102 determines whether the device on which the power restriction is to be performed is currently operating, based on the operational state information. When the result of this determination is that the device is not currently operating, the movement instructing section 102 again references the power restriction schedule, identifies another device on which the power restriction is to be performed at the next execution time, and transmits to the robot 200 movement instructions indicating the position of the area in which this other identified device is arranged.

The restriction instructing section 106 references the power restriction schedule and, when the current time is the execution time, transmits the power restriction instructions to the robot 200. The restriction instructing section 106 may provide power restriction instructions in which the device corresponding to the movement instructions serves as the device on which the power restriction is to be performed. The restriction instructing section 106 may transmit power restriction instructions that do not indicate the device on which the power restriction is to be performed, and may select, as the device on which the power restriction is to be performed, a device for which the robot 200 can efficiently restrict power consumption based on the power consumption and operational state of the device, for example, in response to the robot 200 receiving the power restriction instructions.

The power consumption pattern acquiring section 108 acquires from the robot 200, via the network 20, a power consumption pattern indicating the amount of change over time of the power consumption of each device, and supplies the power consumption pattern to the schedule creating section 110. The designation information acquiring section 112 acquires from the user of the device, e.g. the owner of the house 10, via the robot 200, designation information indicating devices on which the power restriction may be performed, from among the devices set in the house 10. The schedule creating section 110 creates the power restriction schedule based on the power consumption pattern and the designation information. A detailed description of the process by which the schedule creating section 110 creates the power restriction schedule is provided further below.

FIG. 3 shows an exemplary power restriction schedule held by the schedule holding section 120. The power restriction schedule shows, in association with each execution time, the devices on which the power restriction can be performed at the execution time and the priority ranking for performing the power restriction at the execution time. For example, in the power restriction schedule, the television A, the lighting apparatus A, and the lighting apparatus B are shown as the devices whose power can be restricted at 11:00, together with the priority ranking for executing the power restriction.

FIG. 4 shows exemplary position information held by the position information holding section 122. The position of each area in which a device set in the house 10 is arranged is shown in the position information. For example, the position information may show "first floor living room" as the position of an area in which an lighting apparatus A is arranged. The robot 200 holds map information indicating the layout of the house 10 and, based on information such as "first floor living room" indicating the position included in the movement instructions, references the map information, identifies the position of the "first floor living room," and moves to the identified position. The position information may be acquired from the robot 200 via the network 20. Instead, the position information may be acquired from a personal computer of the user via the network 20.

Figure 5:
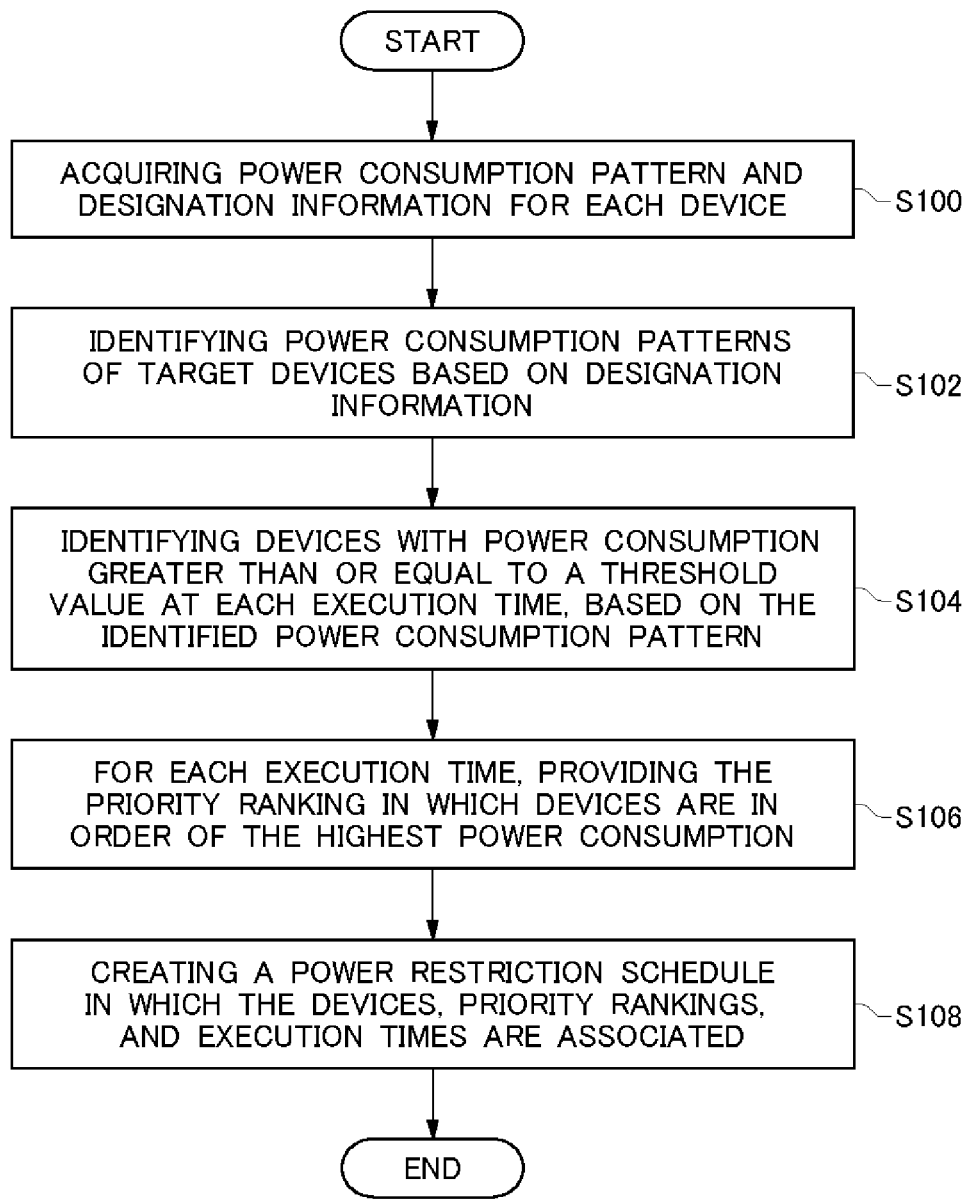
FIG. 5 is a flow chart showing the process for creating the power restriction schedule.

FIG. 5 is a flow chart showing the process by which the schedule creating section 110 creates the power restriction schedule.

The schedule creating section 110 acquires the power consumption pattern of each device via the power consumption pattern acquiring section 108, and acquires the designation information indicating which devices can have the power restriction performed thereon via the designation information acquiring section 112 (S100). Each power consumption pattern may indicate change over time of the average power consumption of the corresponding device over a 24-hour period. The schedule creating section 110 identifies the power consumption pattern of each device indicated by the designation information from among acquired power consumption patterns of the devices (S102). Next, the schedule creating section 110 references the identified power consumption patterns and, at each predetermined power restriction execution time, identifies devices that are consuming an amount of power greater than or equal to the predetermined threshold value at the execution time (S104). Furthermore, the schedule creating section 110 supplies a priority ranking of the identified devices having high power consumption at each execution time (S106), and creates a power restriction schedule in which the identified devices are associated with the execution time and the provided priority ranking (S108).

As a result of performing the power restriction based on the power restriction schedule created as described above, devices with high power consumption among the devices for which the user has allowed power restriction can be prioritized to have the power restriction performed thereon at the execution time. Accordingly, the amount of power restriction at the execution time can be increased. The schedule creating section 110 may create the power restriction schedule by using all of the acquired power consumption patterns, without acquiring the designation information from the user.

Figure 6:
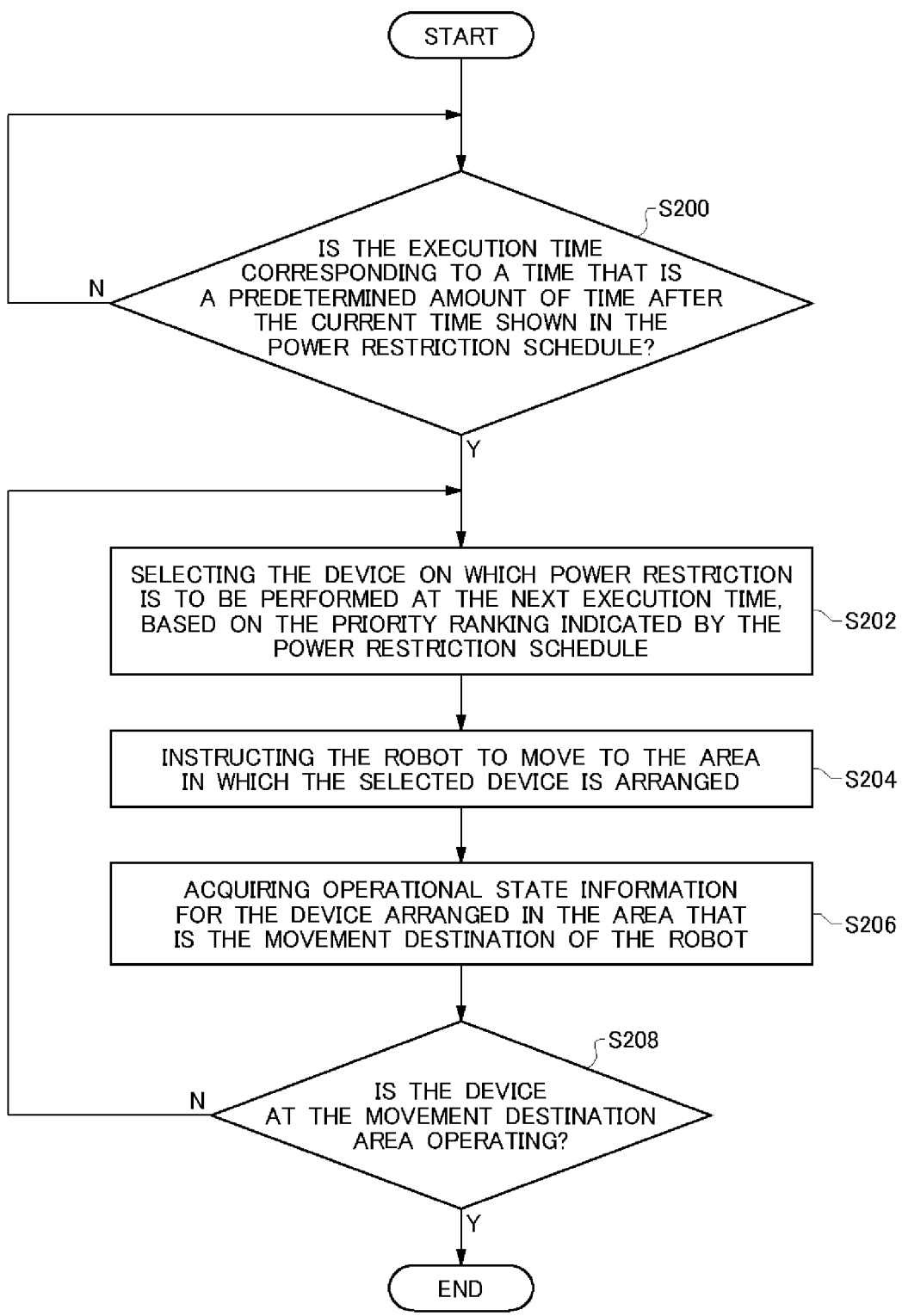
FIG. 6 is a flow chart showing the process for transmitting the movement instructions to the robot.

FIG. 6 is a flow chart showing the process performed by the movement instructing section 102 for transmitting the movement instructions to the robot 200.

The movement instructing section 102 determines whether the next execution time corresponding to a time that is a predetermined amount of time, e.g. 30 seconds, later than the current time is indicated in the power restriction schedule (S200). When the result of the determination is that the next execution time is indicated in the power restriction schedule, the movement instructing section 102 selects the device on which the power restriction is to be performed at the next execution time, based on the priority ranking of the devices associated with the next execution time (S202). The movement instructing section 102 instructs the robot to move to an area in which the selected device is arranged (S204). Specifically, the movement instructing section 102 identifies the position of the area in which the selected device is arranged by referencing the position information, and transmits to the robot 200 movement instructions indicating the identified position. Next, the movement instructing section 102 acquires the operational state information of the device arranged in the movement destination area, which is transmitted by the robot 200 in response to the movement instructions (S206). The movement instructing section 102 identifies the device selected at step S202 from the acquired operational state information, and determines whether the selected device is operating (S208). When the result of this determination is that the selected device is not operating, the process returns to step S202 and the movement instructing section 102 again references the power restriction schedule, selects the device that follows the previously selected device in the ranking priority, and repeats steps S204 to S208.

As described above, the movement instructing section 102 checks the operational state of the device on which the power restriction is to be performed at the next execution time, and therefore the robot 200 can reliably move to the area in which an operating device is arranged prior to the next power restriction execution time.

Figure 7:
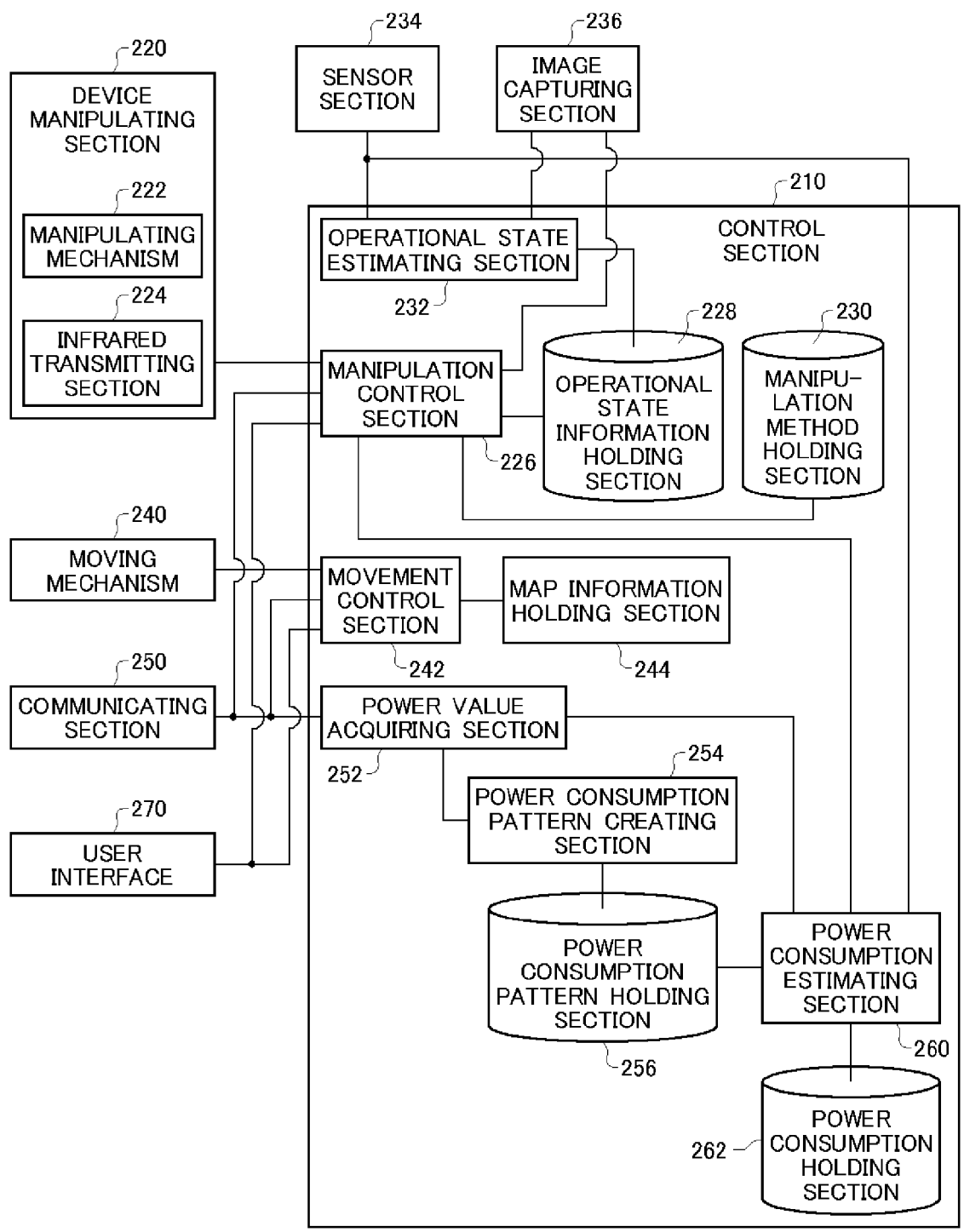
FIG. 7 shows function blocks of the robot.

FIG. 7 shows function blocks of the robot 200. The robot 200 includes a control section 210 that controls the overall robot 200, a device manipulating section 220 that manipulates the devices arranged in the house 10, a moving mechanism 240 for moving within the house 10, and a communicating section 250 for communicating with the power demand management apparatus 100 or the like. Furthermore, the robot 200 may include a user interface 270 that inputs information from a user and outputs information to the user. The user interface 270 may be a microphone, speaker, and display, for example. The information from the user may be the designation information indicating the devices on which the power restriction is allowed to be performed, for example. The robot 200 may include a sensor section 234 such as a temperature sensor that detects the surrounding temperature, a brightness sensor that detects the surrounding brightness, and a person sensor that detects whether a person is present nearby, for example. The robot 200 may include an image capturing section 236 that captures an image of the surrounding area.

The device manipulating section 220 includes a manipulating mechanism 222 and an infrared transmitting section 224. The manipulating mechanism 222 may be a multi-jointed arm.

Upon receiving the power restriction instructions via the communicating section 250, the manipulation control section 226 identifies the device on which the power restriction is to be performed, as indicated by the power restriction instructions, identifies the manipulation method for the identified device by referencing the manipulation method holding section 230, and transmits a power restriction manipulation signal to the device manipulating section 220 based on the identified manipulation method. The device manipulating section 220 performs the power restriction on the device based on the power restriction manipulation signal. The manipulation method holding section 230 holds each device in association with a manipulation method for performing power restriction on the device. The manipulation method may be information relating to switches for turning a device ON and OFF, or information relating to a command code of infrared signals for turning a device ON and OFF, adjusting temperature of the device, or adjusting brightness of the device and an identification code for identifying the device.

When the manipulating mechanism 222 receives the power restriction manipulation signal, the manipulating mechanism 222 may turn OFF a switch provided on a device. The manipulation control section 226 may identify the position of the switch of the device based on an image captured by the image capturing section 236, and cause the manipulating mechanism 222 to press the switch at the identified position. When the infrared transmitting section 224 receives the power restriction manipulation signal, an infrared signal that includes an identification code of the device and a command code indicating an OFF command may be transmitted toward an infrared light receiving section provided on the device. When an ON command for the device is received from the user via the user interface 270, the manipulation control section 226 may identify the manipulation method of the device indicated by the ON command and transmit an ON manipulation signal to the device manipulating section 220 based on the identified manipulation method. The manipulation control section 226 may acquire for each device a time at which the device is turned ON and a time at which the device is turned OFF, and may hold these times in the operational state information holding section 228 as the operational state information indicating the operational state of the device in association with the OFF time, the ON time, and the device.

There are cases in which the devices set in the house 10 are directly turned ON or OFF by the user without using the robot 200. Therefore, when necessary, the operational state estimating section 232 may estimate the operational state of a device based on the image captured by the image capturing section 236 and the temperature and brightness detected by the sensor section 234, for example, and hold this information in the operational state information holding section 228 as the operational state information in which the estimated operational information is associated with the device. The operational state estimating section 232 may estimate the operational state of the device by analyzing the image and determining whether the device is currently operating based on whether a lamp such as an LED that is provided on the device and indicates the ON/OFF state is lit up. Furthermore, the operational state estimating section 232 may estimate the operational state of the air conditioner or the lighting apparatus by determining that the air conditioner or lighting apparatus is ON when a rate of change in temperature or brightness is greater than a predetermined rate of change.

The moving mechanism 240 can freely move within the house 10 according to the movement control signal from the movement control section 242, and may be a wheeled moving mechanism, a crawling moving mechanism, or a legged moving mechanism, for example.

When the movement instructions from the power demand management apparatus 100 are received via the communicating section 250, the movement control section 242 identifies the position of the area indicated by the movement instructions, determines a path from the current position to the identified position by referencing the map information holding section 244, and transmits to the moving mechanism 240 a movement control signal based on the determined path. The moving mechanism 240 causes the robot 200 to move to the area indicated by the movement instructions by causing the robot 200 to move along the path based on the movement control signal.

The power value acquiring section 252 periodically acquires the total power value per unit time that flows through the power line between the commercial power supply 30 and the distribution board 40, from the power sensor 42 that measures the total power value. The power consumption estimating section 260 acquires from the power value acquiring section 252, as a first total power value, the total power value prior to the device that is the target of the power consumption estimation being turned ON or OFF by the manipulation control section 226 and also acquires from the power value acquiring section 252, as a second total power value, the total power value after this device that is the estimation target is turned ON or OFF. The power consumption estimating section 260 estimates the power consumption of the estimation target device by calculating the difference between the first total power value and the second total power value. The power consumption estimating section 260 associates the estimated power consumption with the estimation target device, and holds this information in the power consumption holding section 262.

The power value acquiring section 252 may provide the power consumption pattern creating section 254 with the acquired total power values. The power consumption pattern creating section 254 creates an overall power consumption pattern indicating the change over time of the total power consumption of the house 10 in 24-hour units, based on the total power values provided thereto. Furthermore, the power consumption pattern creating section 254 divides the overall power consumption pattern into power consumption patterns for each device, based on the ON time and OFF time of each device indicated by the operational state information and the change of the power consumption in the overall power consumption pattern, and holds these power consumption patterns in the power consumption pattern holding section 256. The power consumption estimating section 260 may acquire the power values immediately before and immediately after each device is turned ON or OFF, based on the power consumption patterns of the devices held in the power consumption pattern holding section 256, and estimate the power consumption of each device by calculating the difference between the acquired power values.

FIG. 8 shows exemplary operational state information held by the operational state information holding section 228. The operational state information indicates, in association with each device, the ON time of the device, the OFF time of the device, and the operational state showing whether the device is operating.

FIG. 9 is a diagram for describing the process by which the power consumption pattern creating section 254 divides the overall power consumption pattern into power consumption patterns for each device. The power consumption pattern creating section 254 maps the ON time and OFF time of each device in the overall power consumption pattern. Next, the power consumption pattern creating section 254 creates the power consumption patterns of each device by extracting, for each device, the amount of change in the power consumption at each of the mapped times. The power consumption pattern creating section 254 may create one month of the power consumption pattern for each device, and may create an average power consumption pattern for each device by averaging the power consumption pattern.

There are devices among the plurality of devices that can operate under a plurality of setting conditions. For example, the brightness of the lighting apparatus 50 can be set. Furthermore, the air conditioner 60 can be set for heating, cooling, dehumidifying, or as a fan, and the temperature, wind speed, and the like can also be set. In this way, in the case of a device that can operate with a plurality of setting conditions, it is possible that the power consumption changes according to the setting conditions.

In the case of a device that can operate with a plurality of setting conditions via the device manipulating section 220, the robot 200 may sequentially turn ON the predicted target device with each setting condition. In this case, the power consumption estimating section 260 acquires the total power value immediately before and immediately after the device is turned ON, for each of the setting conditions, via the power value acquiring section 252. Furthermore, the power consumption estimating section 260 may estimate the power consumption for each setting condition based on the difference between the total power values acquired for the setting condition. In this case, the power consumption estimating section 260 associates the estimation target device, each of the setting conditions of the device, and the power consumption for each setting condition with each other, and holds this information in the power consumption holding section 262.

There may be a case in which the power consumption of the air conditioner 60 changes due to the surrounding temperature, for example. Therefore, the power consumption estimating section 260 may acquire the temperature at the time when the power consumption is estimated, via a temperature sensor included in the sensor section 234, associate the estimation target device, the estimated power consumption, and the temperature with each other, and hold this information in the power consumption holding section 262.

FIG. 10 shows exemplary power consumption information held by the power consumption holding section 262. In the power consumption information, each device is associated with a power consumption. Furthermore, in the power consumption information, each device may be associated with a setting condition or temperature.

Figure 11:
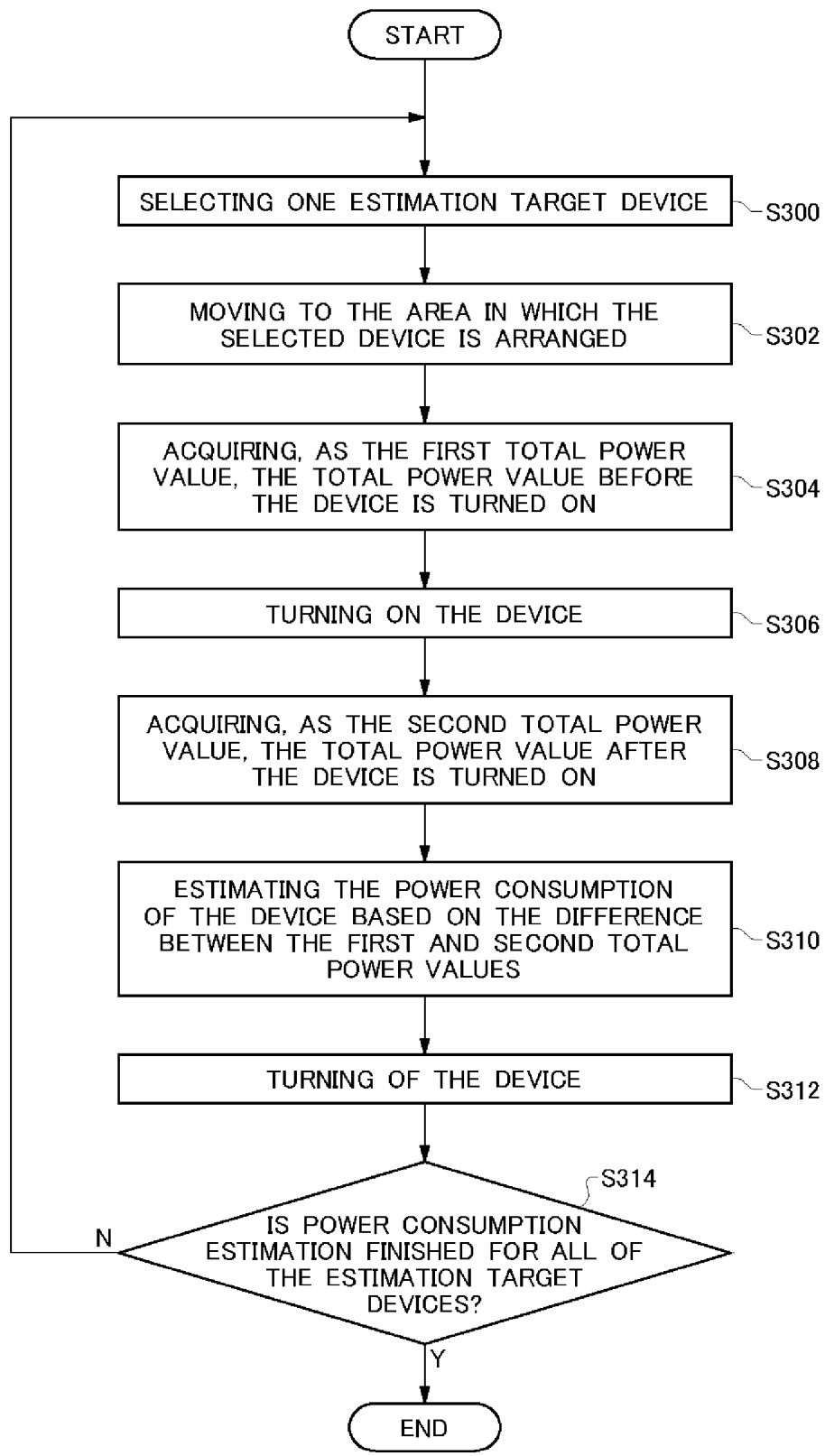
FIG. 11 is a flow chart showing an exemplary process performed by the robot for estimating the power consumption of a plurality of devices that are estimation targets.

FIG. 11 is a flow chart showing an exemplary process performed by the robot 200 for estimating the power consumption of a plurality of devices that are estimation targets.

The manipulation control section 226 selects one estimation target device (S300). The manipulation control section 226 may sequentially select devices that are held in the manipulation method holding section 230 in association with a manipulation method, for example. When the manipulation control section 226 selects an estimation target device, the movement control section 242 references the map information to identify the position of the area in which the selected estimation target device is arranged, determines a path from the current position to the identified position, and transmits a movement control signal to the moving mechanism 240 that causes the robot 200 to move along the determined path. As a result of the moving mechanism 240 moving based on the movement control signal, the robot 200 moves to the area in which the estimation target device is arranged (S302). Next, the power consumption estimating section 260 acquires, as the first total power value, the total power value immediately before the estimation target device is turned ON, via the power value acquiring section 252 (S304). After this, the manipulation control section 226 transmits an ON manipulation signal to the device manipulating section 220 to turn ON the estimation target device, and the device manipulating section 220 turns ON the estimation target device (S306). The power consumption estimating section 260 acquires, as the second total power value, the total power value after the device has been turned ON (S308). The power consumption estimating section 260 may acquire, as the second total power value, the total power value immediately after the device is turned ON, or the total power value obtained after a predetermined amount of time has passed from when the device was turned ON. Next, the power consumption estimating section 260 estimates the power consumption of the estimation target device to be the difference between the first total power value and the second total power value (S310). After the power consumption estimating section 260 has acquired the second total power value, the manipulation control section 226 turns OFF the estimation target device via the device manipulating section 220 (S312). After this, the manipulation control section 226 determines whether the power consumption estimation has been completed for all of the estimation target devices (S314). The manipulation control section 226 may determine whether the power consumption estimation has been completed for all of the estimation target devices by determining whether the power consumption estimation for all of the devices held in the manipulation method holding section 230 in association with the manipulation method has been completed. If the manipulation control section 226 determines that the power consumption estimation has not been completed for all of the estimation target devices, the robot 200 repeats the processes from step S300 to step S314.

In the manner described above, the robot 200 acquires the total power levels before and after a device is turned ON or OFF, for each device, one at a time, and estimates the power consumption for each device based on the differences between the power values acquired for the device.

The robot 200 may estimate the power consumption of a plurality of devices by sequentially turning devices ON and OFF at predetermined times, e.g. times when the user is not present. Furthermore, when performing power restriction on a device or performing a power consumption estimation on a plurality of devices, for example, the robot 200 may ask the user whether the device may be turned ON or OFF prior to actually turning the manipulation target device ON or OFF, and may actually turn the device ON or OFF when the user provides a response indicating that the device may be turned ON or OFF. Furthermore, when an ON command or OFF command for a device is received from the user via the user interface 270, the robot 200 may estimate the power consumption of the device that is the target of the ON command or OFF command. In other words, after receiving the ON command or OFF command, the power consumption estimating section 260 may acquire via the power value acquiring section 252, as the first total power value, the power value at a time before the device is tuned ON or OFF by the device manipulating section 226 and acquire via the power value acquiring section 252, as the second total power value, the power value at a time after the device is turned ON or OFF by the device manipulating section 226 after the ON command or OFF command is received. The power consumption estimating section 260 estimates the power consumption of the device that has been turned ON or OFF by calculating the difference between the acquired first total power value and second total power value.

The power consumption estimating section 260 may periodically estimate the power consumption of each device, and may estimate the power consumption of the devices by calculating an average of the estimated power consumptions.

The robot 200 configured in the manner described above moves to the position of the area indicated by the movement instructions, based on the movement instructions transmitted from the power demand management apparatus 100 a predetermined amount of time before the power restriction execution time, and waits at this position until the power restriction execution time. Furthermore, in response to the movement instructions, the robot 200 acquires from the operational state information holding section 228 the operational state information of the device arranged in the movement destination area indicated by the movement instructions, and transmits the operational state information to the power demand management apparatus 100. In this case, when new movement instructions are received from the power demand management apparatus 100, the robot 200 moves to the area indicated by the new movement instructions.

The robot 200 acquires the total power value before and after a device is turned ON or OFF, for each device, one at a time, and estimates the power consumption of the device based on the difference between the total power values. Furthermore, the robot 200 estimates the power consumption of each device based on the overall power consumption pattern of the house 10 and the ON time and OFF time of the device.

In order to estimate the power consumption of each device, while moving around the house 10, the robot 200 may individually turn ON or OFF each of the devices arranged in the house 10, associate the ON time and OFF time with each device, and hold this information in the operational state information holding section 228. By individually turning each device ON and OFF, the robot 200 can easily separate the power consumption pattern of each device from the overall power consumption pattern, thereby easily estimating the power consumption of each device.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. A power demand management apparatus comprising:
   a hardware schedule holding section that holds a power restriction schedule indicating a device on which a mobile robot is to perform power restriction, in association with a power restriction execution time;
   a hardware movement instructing section that transmits, via a network, movement instructions to the mobile robot such that, prior to the power restriction execution time indicated in the power restriction schedule held by the schedule holding section, the mobile robot moves to an area in which is arranged the device on which the power restriction is to be performed at the execution time; and
   a hardware restriction instructing section that transmits, via the network, power restriction instructions to the mobile robot, the power restriction instructions for causing the mobile robot to perform the power restriction on the device at the execution time according to the power restriction schedule held by the schedule holding section.

2. The power demand management apparatus according to claim 1, further comprising an operational state information acquiring section that, after the movement instructions are sent, acquires from the mobile robot operational state information indicating a current operational state of the device, wherein the schedule holding section holds the power restriction schedule, in which is shown the device and another device that has a lower priority ranking than the device, in association with the execution time, and the movement instructing section determines whether the device is currently operating based on the operational state information acquired by the operational state information acquiring section and, if the device is not currently operating, transmits movement instructions to the mobile robot that cause the mobile robot to move to an area in which the other device is arranged.

3. The power demand management apparatus according to claim 2, further comprising:

a power consumption pattern acquiring section that acquires power consumption patterns for a plurality of devices; and a schedule creating section that identifies devices whose power consumption is greater than or equal to a predetermined threshold value at the execution time, based on the power consumption patterns acquired by the power consumption pattern acquiring section, creates the power restriction schedule, in which the priority ranking is arranged in order of the identified devices having the highest power consumption, in association with the execution time, and holds the power restriction schedule in the schedule holding section.

4. The power demand management apparatus according to claim 3, further comprising a designation information acquiring section that acquires, from a user of the devices, designation information indicating devices that are allowed to be selected as the devices on which power restriction is to be performed from among the plurality of devices, wherein the schedule creating section selects the devices indicated by the designation information acquired by the designation information acquiring section from among the identified devices, and creates the power restriction schedule, in which the priority ranking is arranged in order of the selected devices having the highest power consumption, in association with the execution time.

5. The power demand management apparatus according to claim 2, further comprising a position information holding section that holds position information in which each of a plurality of devices are associated with a position of an area in which the device is arranged, wherein the movement instructing section identifies the position of the area corresponding to each device by referencing the position information held by the position information holding section, and transmits to the mobile robot movement instructions indicating the identified position.

6. The power demand management apparatus according to claim 1, further comprising a position information holding section that holds position information in which each of a plurality of devices are associated with a position of an area in which the device is arranged, wherein the movement instructing section identifies the position of the area corresponding to each device by referencing the position information held by the position information holding section, and transmits to the mobile robot movement instructions indicating the identified position.

7. A power demand management system comprising:
a mobile robot; and
a power demand management apparatus in communication with the mobile robot, wherein the power demand management apparatus includes:

a schedule holding section that holds a power restriction schedule indicating a device on which the mobile robot is to perform power restriction, in association with a power restriction execution time;

a movement instructing section that transmits movement instructions to the mobile robot such that, prior to the power restriction execution time indicated in the power restriction schedule held by the schedule holding section, the mobile robot moves to an area in which is arranged the device on which the power restriction is to be performed at the execution time; and a restriction instructing section that transmits power restriction instructions to the mobile robot, the power restriction instructions for causing the mobile robot to perform the power restriction on the device at the execution time.

8. The power demand management system according to claim 7, wherein in response to the movement instructions, the mobile robot provides the power demand management apparatus with operational state information indicating a current operational state of a device arranged in an area that is the movement destination.

9. The power demand management system according to claim 8, wherein the mobile robot includes an operational state estimating section that estimates the operational state of a device based on temperature or brightness detected by a sensor section or on an image captured by an image capturing section, associates the estimated operational state with the device, and stores this association in an operational state information holding section as the operational state information.

10. The power demand management system according to claim 7, wherein the mobile robot includes:

a power value acquiring section that acquires a total power value per unit time flowing through a power line that connects a commercial power supply to a distribution board; and a power consumption estimating section that acquires from the power value acquiring section, as a first total power value, the total power value of a device that is a target for power consumption estimation before the device is turned ON or OFF, acquires from the power value acquiring section, as a second total power value, the total power value of the device that is the target for power consumption estimation after the device is turned ON or OFF, and estimates the power consumption of the device that is the target for power consumption estimation based on a difference between the first total power value and the second total power value.

11. The power demand management system according to claim 10, wherein the power consumption estimating section acquires from the power value acquiring section, as each of a plurality of first total power values, the total power value of the device that is the target for power consumption estimation before the device is turned ON or OFF with a respective setting condition, acquires from the power value acquiring section, as each of a plurality of second total power values, the total power value of the device that is the target for power consumption estimation after the device is turned ON or OFF with the respective setting condition, and estimates the power consumption of the device that is the target for power consumption estimation for each of the setting conditions based on a difference between the first total power value and the second total power value acquired for the setting condition.

12. The power demand management system according to claim 7, wherein the mobile robot includes:
- a moving mechanism that moves to an area in which the device is arranged;
- a map information holding section that holds map information in which the device is associated with the area in which the device is arranged; and
- a movement control section that controls the moving mechanism to move to the area in which the device is arranged, based on the map information held by the map information holding section.

13. The power demand management system according to claim 7, wherein
the power demand management apparatus further includes an operational state information acquiring section that, after the movement instructions are sent, acquires from the mobile robot operational state information indicating a current operational state of the device, wherein
the schedule holding section holds the power restriction schedule, in which is shown the device and another device that has a lower priority ranking than the device, in association with the execution time, and
the movement instructing section determines whether the device is currently operating based on the operational state information acquired by the operational state information acquiring section and, if the device is not currently operating, transmits movement instructions to the mobile robot that cause the mobile robot to move to an area in which the other device is arranged.

14. The power demand management system according to claim 13, wherein the power demand management apparatus further includes:
- a power consumption pattern acquiring section that acquires power consumption patterns for a plurality of devices; and
- a schedule creating section that identifies devices whose power consumption is greater than or equal to a predetermined threshold value at the execution time, based on the power consumption patterns acquired by the power consumption pattern acquiring section, creates the power restriction schedule, in which the priority ranking is arranged in order of the identified devices having the highest power consumption, in association with the execution time, and holds the power restriction schedule in the schedule holding section.

15. The power demand management system according to claim 14, wherein
the power demand management apparatus further includes a designation information acquiring section that acquires, from a user of the devices, designation information indicating devices that are allowed to be selected as the devices on which power restriction is to be performed from among the plurality of devices, and
the schedule creating section selects the devices indicated by the designation information acquired by the designation information acquiring section from among the identified devices, and creates the power restriction schedule, in which the priority ranking is arranged in order of the selected devices having the highest power consumption, in association with the execution time.

16. The power demand management system according to claim 7, wherein
the power demand management apparatus further includes a position information holding section that holds position information in which each of a plurality of devices are associated with a position of an area in which the device is arranged, wherein
the movement instructing section identifies the position of the area corresponding to each device by referencing the position information held by the position information holding section, and transmits to the mobile robot movement instructions indicating the identified position.

* * * * *